(12) United States Patent
Glozman et al.

(10) Patent No.: US 12,043,761 B2
(45) Date of Patent: Jul. 23, 2024

(54) COMPOSITION COMPRISING SEMICONDUCTING LIGHT EMITTING NANOPARTICLES

(71) Applicant: MERCK PATENT GMBH, Darmstadt (DE)

(72) Inventors: Denis Glozman, Modiin (IL); Ehud Shaviv, Modiin (IL); Yuki Hirayama, Tokyo (JP); Teruaki Suzuki, Kanagawa (JP); Christian-Hubertus Kuechenthal, Jerusalem (IL)

(73) Assignee: MERCK PATENT GMBH, Darmstadt (DE)

(*) Notice: Subject to any disclaimer, the term of this patent is extended or adjusted under 35 U.S.C. 154(b) by 0 days.

(21) Appl. No.: 17/851,479

(22) Filed: Jun. 28, 2022

(65) Prior Publication Data
US 2022/0332956 A1    Oct. 20, 2022

Related U.S. Application Data

(62) Division of application No. 17/257,377, filed as application No. PCT/EP2019/067670 on Jul. 2, 2019, now abandoned.

(30) Foreign Application Priority Data

Jul. 5, 2018   (EP) .................................. 18182015

(51) Int. Cl.
| | |
|---|---|
| C09D 5/22 | (2006.01) |
| C09D 7/63 | (2018.01) |
| C09K 11/02 | (2006.01) |
| C09K 11/08 | (2006.01) |
| C09K 11/88 | (2006.01) |

(52) U.S. Cl.
CPC .................. *C09D 5/22* (2013.01); *C09D 7/63* (2018.01); *C09K 11/02* (2013.01); *C09K 11/025* (2013.01); *C09K 11/0883* (2013.01); *C09K 11/883* (2013.01)

(58) Field of Classification Search
CPC ..................................................... C09K 11/02
See application file for complete search history.

(56) References Cited

U.S. PATENT DOCUMENTS

| | | | | |
|---|---|---|---|---|
| 7,160,613 | B2* | 1/2007 | Bawendi | C09K 11/565 |
| | | | | 428/407 |
| 7,645,402 | B2 | 1/2010 | Choi et al. | |
| 8,471,969 | B2 | 6/2013 | Banin et al. | |
| 9,909,738 | B2 | 3/2018 | Xu et al. | |
| 10,676,666 | B2 | 6/2020 | Kwon et al. | |
| 2011/0017951 | A1 | 1/2011 | Ryowa et al. | |
| 2011/0084250 | A1 | 4/2011 | Jang et al. | |
| 2017/0283691 | A1* | 10/2017 | Nick | C09K 11/02 |
| 2018/0044583 | A1 | 2/2018 | Kwon et al. | |
| 2018/0044586 | A1 | 2/2018 | Kwon et al. | |
| 2018/0081236 | A1 | 3/2018 | Chikushi et al. | |
| 2018/0148638 | A1 | 5/2018 | Ahn et al. | |
| 2018/0151817 | A1* | 5/2018 | Cho | C09K 11/06 |
| 2021/0284905 | A1 | 9/2021 | Kwon et al. | |

FOREIGN PATENT DOCUMENTS

| | | | |
|---|---|---|---|
| CN | 108102640 | A | 6/2018 |
| JP | 2007181810 | A | 7/2007 |
| KR | 20180018891 | A | 2/2018 |
| WO | 2010095140 | A | 8/2010 |
| WO | WO 2014/024068 | * | 2/2014 |
| WO | 2016035602 | A1 | 3/2016 |
| WO | 2016189827 | A1 | 12/2016 |

OTHER PUBLICATIONS

International Search Report for PCT/EP2019/067670 dated Aug. 28, 2019.
Cunningham, P. D. et al., "Assessment of Anisotropic Semiconductor Nanorod and Nanoplatelet Heterostructures with Polarized Emission for Liquid Crystal Display Technology," ACS Nano, 2016, 10 (6), pp. 5769-5781.
Nann, Thomas, "Phase-transfer of CdSe@znS quantum dots using amphiphilic hyperbranched polyethylenimine," Chem. Commun., 2005, 1735-1736.
Search report in corresponding JP Appln. No. 2021-500023 dispatched Jul. 31, 2023 (pp. 1-7) and english translation thereof (pp. 1-5).
Office Action in corresponding Chinese Application for Invention No. 201980043674.0 issued Jan. 17, 2024 (pp. 1-7) and English translation thereof (1 page).
Notice of Grounds for Rejection in corresponding Korean Patent Application No. 10-2021-7002479 dated Mar. 19, 2024 (pp. 1-10) and English translation thereof (pp. 1-10).

\* cited by examiner

*Primary Examiner* — C Melissa Koslow
(74) *Attorney, Agent, or Firm* — MILLEN, WHITE, ZELANO & BRANIGAN, P.C.; Csaba Henter

(57) ABSTRACT

A method of manufacturing a composition with improved quantum yield, containing at least these steps: a/ manufacturing a mixture by at least these steps: 1/ providing a semiconducting light emitting nanoparticle, 2/ adding a macromolecular compound comprising at least an anchoring group; 3/ adding an organic additive, and b/ subjecting the mixture from step a/ to irradiation with light of a wavelength in the range of 300 to 600 nm having an intensity in the range of 0.025 to 1 W/cm² to obtain the composition; wherein the organic additive is defined by formula (Ia): M-(X—Y)$_2$, wherein M is a divalent metal ion, X is a hydrocarbon chain, and Y is a functional group.

12 Claims, No Drawings

COMPOSITION COMPRISING SEMICONDUCTING LIGHT EMITTING NANOPARTICLES

The present invention relates to a composition comprising at least these components: i) a semiconducting light emitting nanoparticle; ii) a macromolecular compound comprising at least an anchoring group; and iii) an organic additive. The invention further relates to a method of manufacturing a composition with improved solubility/dispersion properties while maintaining/improving the original quantum yield of the nanomaterials, a method of manufacturing a solution of the semiconducting light emitting nanoparticle in organic medium that can be used for producing a layered composite comprising at least these steps: (A) manufacturing a mixture by at least these steps: i) providing a semiconducting light emitting nanoparticle; ii) adding a macromolecular compound comprising an anchoring group; iii) adding an organic additive; (B) applying the mixture to a substrate in order to form a layer; and (C) drying the layer on the substrate. The invention further relates to a layered composite obtainable by said method and a layered composite comprising: a) a substrate; β) at least a layer comprising: a. a semiconducting light emitting nanoparticle; b. a macromolecular compound comprising an anchoring group; and c. an organic additive. The invention relates also to a use of an organic additive to improve the efficiency of the emission of light.

Semiconducting light emitting nanoparticles, also referred to as quantum materials, such as quantum dots, quantum rods, tetrapods and the like are of great interest as color converter materials in LEDs and displays due to their narrow fluorescence emission. Using light emitting quantum material for applications such as down conversion layers in LCDs, color filters and color converters directly on top of LEDs requires the Semiconducting nanocrystals to be incorporated into a thin layer that would provide protection for the nanocrystals. A polymer film which contains a quantum material is one way to achieve these desired thin layers. Various polymers have been used for this purpose, such as acrylate, siloxanes, silazanes, epoxies, silicones, and so on. In particular, acrylates are abundantly used for backlight film applications.

Incorporation of a quantum material like quantum dots into this kind of layers causes a drop in their emission quantum Yield (QY). This is caused by aggregation of the quantum materials in the solid polymer film and due to chemical processes, which affect the organic molecules attached to the surface of the quantum material (known as ligands) and cause detachment of the ligands from the quantum materials surface occurs.

In a more recent development, InP based nanocrystals became the leading candidates for cadmium free quantum material based display materials. Surface treatment methods could be a pathway for gaining solubility in different solvents and matrices and improving the quantum yield of such materials. The use of dispersants is one technique to render quantum materials soluble in solvents that are not per se suitable for the quantum materials, for example when dispersing a non-polar quantum material in polar solvents. Many commercially available wetting and dispersing agents are known for this purpose, but these agents are not "tailor made". Thus, their compatibility to different sorts of quantum material vary and often has negative influence on the stability of the dispersion of quantum material and on the emissive quantum yield.

Accordingly, and despite all efforts of the past it is still an object to provide an improved dispersion of a semiconducting light emitting nanoparticle, preferably a quantum material in a per se incompatible medium and to preserve the achievable emissive quantum yield of the quantum material.

In general terms, it is an object of the present invention to at least partly overcome at least one of the disadvantages that are known from the prior art.

Another object is to provide a composition comprising a semiconducting light emitting nanoparticle, preferably a quantum material for application on substrates which can be used to manufacture layers with said semiconducting light emitting nanoparticle, wherein the quantum yield of the semiconducting light emitting nanoparticle, preferably a quantum material is preserved, and not reduced as is in those known in the art.

Another object of the invention is to provide semiconducting light emitting nanoparticle, preferably a quantum material in a composition, wherein the quantum material is more efficient and/or exhibit higher output than those known in the art.

Another object of the invention is to provide a semiconducting light emitting nanoparticle as part of a composition, wherein the composition exhibits a similar quantum yield and/or exhibits a similar output like the quantum material in the medium without the additive.

Another object of the invention is to provide a semiconducting light emitting nanoparticle as part of a composition, wherein the composition exhibits a higher quantum yield and/or exhibits a higher output than the quantum material in the medium without the additive.

Another object of the invention is to provide a semiconducting light emitting nanoparticle, preferably a quantum material in a composition with high stability and high quantum yield over the lifetime of the quantum material.

Another object of the invention is to provide means, auxiliaries or methods to improve the quantum yield of a semiconducting light emitting nanoparticle containing solution.

A contribution to the solution of at least one of the above objects is provided by the subject-matter of the category-forming embodiments. The dependent sub-embodiments of the category-forming embodiments represent preferred embodiments of the invention, the subject-matter of which also makes a contribution to solving at least one of the objects mentioned above.

Definitions

The term "in the range from x to y" is understood in the present context to comprise all values between the number x and y, and the limit forming numbers x and y. For example, the term "in the range from 2 to 13" comprises the numbers 2, 13 and all in between.

The term "inorganic" in the present context describes any material not containing any carbon atoms which are bound to other carbon atoms and/or hydrogen atoms. Inorganic material, however, can comprise one or more compounds, which contain carbon atoms ionically bound to other atoms such as carbon monoxide, carbon dioxide, carbonates, cyanides, cyanates, carbides, and thiocyanates.

The term "transparent" means in the present context that at least around 60% of incident light pass through a sample of a thickness of 5 μm and at a reference wavelength of 450 nm. Preferably, more than 70%, or more than 75%, or more than 80% of incident light pass through the sample.

The term "macromolecular compound" can be any kind of polymer or polymer blend which is known and appears useful to be employed in the present composition to a skilled person. An example of a suited macromolecular compound is an acrylate polymer, or a block copolymer comprising an acrylate.

A liquid phase is a composition of one or more components which is liquid at room temperature (20° C.). This means that a maximum of 1 wt.-% of the composition does not pass a filter with pores having 1 μm.

Although the term "nano-sized" is clear for every skilled person working in the technological are to which the present invention belongs, it should be expressed that nano-sized has the meaning of an average particle diameter in the range of 0.1 nm to 999 nm, preferably 1 nm to 150 nm, more preferably 3 nm to 50 nm.

According to the present invention, the term "semiconductor" means a material that has electrical conductivity to a degree between that of a conductor (such as copper) and that of an insulator (such as glass) at room temperature. Preferably, a semiconductor is a material whose electrical conductivity increases with the temperature.

Thus, according to the present invention, semiconducting light emitting nanoparticle is taken to mean that the light emitting material which size is in between 0.1 nm and 999 nm, preferably 1 nm to 150 nm, more preferably 3 nm to 50 nm, having electrical conductivity to a degree between that of a conductor (such as copper) and that of an insulator (such as glass) at room temperature, preferably, a semiconductor is a material whose electrical conductivity increases with the temperature, and the size is in between 0.1 nm and 999 nm, preferably 0.5 nm to 150 nm, more preferably 1 nm to 50 nm.

According to the present invention, the term "size" means the average diameter of the longest axis of the semiconducting nano-sized light emitting particles.

The average diameter of the semiconducting nano-sized light emitting particles are calculated based on 100 semiconducting light emitting nanoparticles in a TEM image created by a Tecnai G2 Spirit Twin T-12 Transmission Electron Microscope.

A liquid organic phase is a liquid phase of organic compounds. Organic compounds are compounds that are composed of one or more carbon-carbon and/or carbon-hydrogen bonds.

A "Polymer" is a material which is built by one or more repeat units.

Chemical compounds can be followed by an expression in brackets. In this event, the bracket mentions a trademark for illustrative purposes, under which the chemical compound can be purchased.

DETAILED DESCRIPTION OF THE INVENTION

A first aspect of the invention is a composition comprising at least these components:
  i) a semiconducting light emitting nanoparticle;
  ii) a macromolecular compound comprising at least an anchoring group;
  iii) an organic additive; which is preferably not a polymer;
  iv) optionally, a liquid organic phase.

The composition can be of any kind known to a skilled person. The composition is a suspension, so it comprises liquid and solid constituents. An example of a liquid constituent is the organic phase. The quantum material is an example of solid constituents. Each one of the further constituents of the composition can be of solid or liquid state at room temperature (20° C.). Each one of the further constituents solid at room temperature can be present as a solid in the composition, or at least partially dissolve or form a gel through the liquid constituents of the composition.

The semiconducting light emitting nanoparticle as a constituent of the composition can be any kind of semiconducting light emitting nanoparticles known to and considered potentially useful by the skilled person. A semiconducting light emitting nanoparticle in the context of the present invention can be of any shape known shape for a quantum material, yet is preferably selected from a rod, a dot, a platelet, a flower and a wire. Further, the quantum material can comprise a combination of two or more of the aforementioned shapes.

According to the present invention, the term "semiconducting" describes a material whose electronic structure comprises a conduction band, a valence band, and a band gap between the two. The band gap of a semiconducting material is usually larger than zero and less than 4 eV at a temperature of 300K.

So, a "semiconducting" material has electrical conductivity to a degree between that of a conductor (such as copper) and that of an insulator (such as glass) at room temperature. Preferably, a semiconducting material has an electrical conductivity increases with the temperature.

The term "nanoparticles" means particles which have a size in between 0.1 nm and 999 nm, preferably 0.5 nm to 150 nm, more preferably 1 nm to 50 nm. The term "size" in the present context means the average diameter of the longest axis which can be established through the particles referred to. The size of these nanoparticles refers to the dimension of the inorganic, semiconducting nanoparticle, not considering the dimensions of possibly present ligands on the surface of the inorganic semiconducting nanoparticle, or other surface modification applied thereto. The average diameter of a certain particle is calculated based on statistics measured by Transmission Electron Microscope (TEM).

The term "light emitting" refers to the property of a material or object to emit light at least of a wavelength from 350 nm to 1000 nm upon an external optical excitation such as an incident beam of light of a specific wavelength or a specific wavelength range.

The term "semiconducting light emitting nanoparticle" in the present context refers to a light emitting material which is in accordance with the definition of "semiconducting" and has a nanoparticle size is in between 0.1 nm and 999 nm, preferably 1 nm to 150 nm, more preferably 1 nm to 50 nm.

In a preferred embodiment of the present invention, the semiconducting light emitting nanoparticle of the present invention is a quantum sized material.

According to the present invention, the term "quantum sized" means the size of the semiconducting material itself without ligands or another surface modification, which can show the quantum confinement effect, like described in, for example, ISBN:978-3-662-44822-9.

The quantum material can emit light. The quantum material can emit tunable, sharp and light in the VIS and IR range. VIS refers to light of a wavelength from 400 to 700 nm; IR refers to light of a wavelength above 700 nm up to about 1 mm.

In a preferred embodiment of the present invention, the quantum material is selected from the group consisting of II-VI, III-V, and IV-VI semiconductors, and a combination of two or more thereof.

More preferably, the quantum material is selected from the group consisting of Cds, CdSe, CdTe, ZnS, ZnSe, ZnTe, ZnO, GaAs, GaP, GaAs, GaSb, HgS, HgSe, HgSe, HgTe, InAs, InP, InPZn, InPZnS, InSb, AlAs, AlP, AlSb, $Cu_2S$, $Cu_2Se$, $CuInS2$, $CuInSe_2$, $Cu_2(ZnSn)S_4$, $Cu_2(InGa)S_4$, $TiO_2$, InGaP, ZnSeS, alloys, and a combination of two or more thereof.

For example, for red emission use CdSe/CdS, CdSeS/CdZnS, CdSeS/CdS/ZnS, ZnSe/CdS, CdSe/ZnS, InP/ZnS, InP/ZnSe, InP/ZnSe/ZnS, InPZn/ZnS, InPZn/ZnSe/ZnS dots or rods, ZnSe/CdS, ZnSe/ZnS and a combination of two or more thereof.

For example, for green emission use CdSe/CdS, CdSeS/CdZnS, CdSeS/CdS/ZnS, ZnSe/CdS, CdSe/ZnS, InP/ZnS, InP/ZnSe, InP/ZnSe/ZnS, InPZn/ZnS, InPZn/ZnSe/ZnS, ZnSe/CdS, ZnSe/ZnS and a combination of two or more thereof.

For example, for blue emission use, e.g., ZnSe, ZnS, ZnSe/ZnS, and a combination of two or more thereof.

As a quantum material, publicly available quantum material, for examples, CdSeS/ZnS alloyed quantum materials product number 753793, 753777, 753785, 753807, 753750, 753742, 753769, 753866, InP/ZnS quantum materials product number 776769, 776750, 776793, 776777, 776785, PbS core-type quantum materials product number 747017, 747025, 747076, 747084, or CdSe/ZnS alloyed quantum materials product number 754226, 748021, 694592, 694657, 694649, 694630, 694622 from Sigma-Aldrich, can be used preferably as desired.

In some embodiments, the semiconductor nanoparticle can be selected from an anisotropic shaped structure, for example quantum rod material to realize better out-coupling effect (for example *ACS Nano*, 2016, 10 (6), pp 5769-5781).

Examples of quantum rod material have been described in, for example, the international patent application laid-open No. WO2010/095140A.

In a preferred embodiment of the invention, the length of the overall structures of the quantum material, such as a quantum rod material/or the quantum material, is from 1 nm to 500 nm, preferably, from 1 nm to 160 nm, even more preferably, from 1 nm to 20 nm, most preferably, it is from 5 nm to 15 nm.

A macromolecular compound having at least one anchoring group, sometimes also referred to as a dispersing and wetting agent, can be attached onto the surface of the ligand of the quantum material or directly attached onto the surface of the quantum material, partially or fully by using a ligand exchange process. Preferably, the quantum material can comprise a surface ligand. The surface of the quantum material can be over coated with one or more kinds of surface ligands. Without wishing to be bound by theory it is believed that such a surface ligand may lead to disperse the quantum material in an organic solvent more easily. The macromolecular compound can by any kind of macromolecular compound that is known to the skilled person and appears suited in the present invention.

According to the present invention, the composition comprises a macromolecular compound, wherein the macromolecular compound comprises at least one anchoring group. In a preferred embodiment of the invention, the at least one anchoring group, preferably two or all anchoring groups of the macromolecular compound is/are ionic. The macromolecular compound comprising the at least one anchoring group can form a salt in the presence of counter-ions. The macromolecular compound preferable forms a cationic or an anionic species. The counter-ion for a cationic species is an anionic counter-ion, the counter-ion for an anionic species is a cationic counter-ion. One macromolecular compound may have more than one counter-ions of a species.

In a preferred embodiment of the present invention, the at least one anchoring group of the macromolecular compound is anionic and selected from the group consisting of phosphine group, phosphine oxide group, phosphate group, phosphonate group, thiol group, tertiary amine, carboxyl group, hetero cyclic group, silane group, sulfonic acid, hydroxyl group.

In a further preferred embodiment of the present invention, 90% or more of all anchoring groups of the macromolecular compound are selected form group above, the % based on the absolute number of anchoring groups. Further preferred, 90% or more of all anchoring groups are identical, the % based on the absolute number of anchoring groups.

More preferably, the anchoring group of the macromolecular compound is a quaternary ammonium salt represented by following chemical formula (I),

$$-N^+R_1R_2R_3X^- \quad (I)$$

wherein $R_1$ is a hydrogen atom, alkyl group having 1 to 30 carbon atoms, or an aryl group having 1 to 30 carbon atoms; $R_2$ is a hydrogen atom, alkyl group having 1 to 30 carbon atoms, or an aryl group having 1 to 30 carbon atoms; $R_3$ is a hydrogen atom, alkyl group having 1 to 30 carbon atoms, or an aryl group having 1 to 30 carbon atoms; and wherein $R_1$, $R_2$ and $R_3$ can be same or different of each other; and wherein X is an anion selected from the group consisting of F, Cl, Br, I, phosphate, carboxylate, sulfonate, and phosphonate.

Even more preferably, $R_1$ is a hydrogen atom or an alkyl group having 1 to 30 carbon atoms; $R_2$ is a hydrogen atom or an alkyl group having 1 to 30 carbon atoms; $R_3$ is a hydrogen atom or an alkyl group having 1 to 30 carbon atoms; $R_1$, $R_2$ and $R_3$ can be same or different of each other.

In a preferred embodiment of the present invention, the macromolecular compound is at least in part attached directly onto the surface of the quantum material. By using ligand exchange method, described in for example, Thomas Nann, Chem. Commun., 2005, 1735-1736, DOI: 10.1039/b-414807j, the macromolecular compound can be introduced onto the surface of the quantum material.

According to the present invention, the weight-average molecular weight of the macromolecular compound is not particularly limited. It can be of any number which appears suitable to a skilled person. Preferably, the weight-average molecular weight is in the range from 1,000 to 100,000 g/mol. More preferably, it is in the range from 2,000 to 50,000 g/mol, or from 5,000 to 30,000 g/mol. Macromolecular compounds of the preferred weight range were found to contribute to an improved dispersivity and film strength. The weight-average molecular weight ($M_w$) is determined by means of GPC (=gel permeation chromatography) against polystyrene calibration standards, solvent THF.

In a further preferred embodiment of the invention, the macromolecular compound is based on a at least one copolymer.

In a further preferred embodiment of the invention, the copolymer is selected from the group consisting of graft copolymer, block copolymer, alternating copolymer, random copolymer, preferably it is a block copolymer.

The macromolecular compound of a further preferred embodiment is selected from the group consisting of DISPERBYK®-100 series, such as DISPERBYK®-180 (being alkylol ammonium salt of a copolymer with acidic groups), and DISPERBYK®-2000 series, such as DISPERBYK®-2000, 2001, 2009 (all available from BYK and all being acrylate copolymer having amine).

The organic additive can be any which is known to the skilled person and appears to be suited in the present invention. The organic additive can comprise metal or and may not comprise any metal species. A metal species in the present context can be a metal cation or elemental metal, which can be presented as is, or as part of a complex. Preferably, the organic additive is not a polymer/macromolecular.

In a preferred embodiment of the invention, the organic additive is defined by formula (Ia) or (Ib)

wherein
M is a divalent metal ion,
X is a hydrocarbon chain, and
Y is a functional group.

In a further preferred embodiment of the invention, the organic additive is defined by formula (Ia) or (Ib) and, at least one of the following applies:
a) M is selected from the group consisting of $Zn^{2+}$, $Mg^{2+}$ and $Cd^{2+}$;
b) Y is selected from the group consisting of carboxylate, carbamate, xanthate, phosphonate, phosphate, thiolate.

A further preferred embodiment is a combination of two or more organic additives, where one of these features applies: a combination of a) and b), or a combination of two or more of a) with one b), or a combination of two or more of b) with one a), or a combination of two or more of a) and two or more of b).

In a further preferred embodiment of the invention, the organic additive is defined by formula (II),

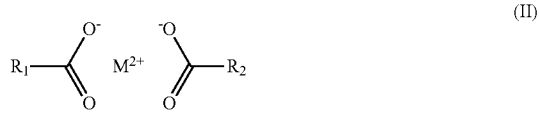

wherein
M is selected from the group consisting of $Zn^{2+}$, $Mg^{2+}$ and $Cd^{2+}$;
$R_1$ and $R_2$ can be same or different, linear or branched, and each $R_1$, $R_2$ is selected from the group consisting of an alkyl having a chain of 1 to 16 carbons atoms or an alkenyl group having a chain of 1 to 15 carbon atoms; preferably 1 to 11, or 1 to 6 carbon atoms.

In a further preferred embodiment of the invention, the organic additive comprises an element selected from the group consisting of a Zinc carboxylate, a Cadmium carboxylate and a Magnesium carboxylate, or a combination of two or more elements thereof.

In a further preferred embodiment of the invention, the organic additive comprises a Zinc carboxylate.

In a further preferred embodiment of the invention, the composition further comprises at least a liquid organic phase. In a further preferred embodiment of the invention, the liquid organic phase of the composition comprises at least one organic solvent.

In a preferred embodiment of the present invention, the solvent can be selected from the group consisting of ethylene glycol monoalkyl ethers, such as, ethylene glycol monomethyl ether, ethylene glycol monoethyl ether, ethylene glycol monopropyl ether, and ethylene glycol monobutyl ether; diethylene glycol dialkyl ethers, such as, diethylene glycol dimethyl ether, diethylene glycol diethyl ether, diethylene glycol dipropyl ether, and diethylene glycol dibutyl ether; ethylene glycol alkyl ether acetates, such as, methyl cellosolve acetate and ethyl cellosolve acetate; propylene glycol alkyl ether acetates, such as, propylene glycol monomethyl ether acetate (PGMEA), propylene glycol monoethyl ether acetate, and propylene glycol monopropyl ether acetate; aromatic hydrocarbons, such as, benzene, toluene and xylene; ketones, such as, methyl ethyl ketone, acetone, methyl amyl ketone, methyl isobutyl ketone, and cyclohexanone; alcohols, such as, ethanol, propanol, butanol, hexanol, cyclohexanol, ethylene glycol, and glycerin; esters, such as, ethyl 3-ethoxypropionate, methyl 3-methoxypropionate and ethyl lactate; and cyclic asters, such as, γ-butyrolactone. Preferred solvents of the above group are propylene glycol alkyl ether acetates, such as, propylene glycol monomethyl ether acetate (hereafter "PGMEA"), propylene glycol monoethyl ether acetate, or propylene glycol monopropyl ether acetate can be used.

In a further preferred embodiment, the liquid organic phase comprises a combination of two or more of the above organic solvents. This includes two or more solvents of one of the groups, or two or more solvents from different of the above groups.

In a further preferred embodiment of the invention, the composition further comprises at least one matrix polymer. Any polymer can be selected as matrix polymer which is known to the skilled person and appears to be suited to be employed as matrix for the quantum material of the present invention. Preferred matrix polymers are those, which are transparent and suited for the manufacture of optical devices.

In a further preferred embodiment of the invention, the matrix polymer has a weight-average molecular weight in the range from 1,000 to 300,000 g/mol, more preferably from 10,000 to 250,000 g/mol.

In a further preferred embodiment of the invention, the matrix polymer has a glass transition temperature (Tg) which is 70° C. or more. Yet more preferred, the glass transition temperature of the matrix polymer is in the range from 70° C. to 250° C. The glass transition temperature is measured according to DIN EN ISO 11357, Teil 1-6 using a Dynamic Scanning Calorimetry instrument, for example a PerkinElmer DSC-8000.

In a further preferred embodiment of the invention, the matrix polymer is selected from an acrylate, an epoxy resin, a polyurethane and a polysiloxanes.

A second aspect of the invention is a method of manufacturing a composition as described with the first aspect and its embodiments.

A third aspect of the invention is method of manufacturing a composition with improved quantum yield, comprising at least these steps:
a/ Manufacturing a mixture by at least these steps:
1/ Providing a quantum material;
2/ Adding a macromolecular compound comprising at least an anchoring group;
3/ Adding an organic additive;
4/ optionally adding at least an organic solvent;
b/ Subjecting the mixture from step a/ to irradiation with light of a wavelength selected from a range of 300 to 600 nm having an intensity in the range from 0.025 to 1 W/cm² to obtain the composition.

The intensity of light is measured at the surface of the mixture of the light source side.

Steps 1/ to 4/ can be carried out in individual actions or by just combining some or all components to the mixture in one vessel and forming the mixture by stirring the vessel's content.

In step 2/, a macromolecular compound comprising at least one anchoring group is added to the quantum material of step 1/. The macromolecular compound can be added as a solid, for example as powder. It can also be dispersed or dissolved in a liquid phase. The liquid phase can comprise any kind of liquid phase, optionally comprising one or more of the organic solvents, which is known to the skilled person and considered useful to have a quantum material and the macromolecular compound comprising at least one anchoring group dispersed therein. Reference is made to the section of the first aspect to the present invention regarding organic solvents and preferred embodiments. A preferred organic phase for this is PGMEA.

In step 3/ an organic additive is added to the combined liquid phases of step 1/ and 2/. The organic additive can be added in pure or diluted form. Preferably, the organic additive is added pure. Reference is made to the section related to the organic additive, as described in the first aspect to the present invention, in particular regarding a preferred choice of organic additive and further preferred embodiments.

In optional step 4/, at least an amount of at least an organic solvent is added. The organic solvent of this step can be same or different to any organic solvent present in any of the liquid phases added in any one of step 1/ to 3/. Reference is made to the section of the first aspect to the present invention regarding suited organic solvents and preferred embodiments. A preferred organic phase for this is PGMEA.

The mixture of step a/ can be obtained by agitating the constituents of step 1/ to 3/, and optionally including the constituent of step 4/. Agitation can be performed individually in each of the aforementioned steps 1/ through 3/ and optionally also in step 4/. In a preferred embodiment, a liquid phase is provided under agitation with the quantum material in step 1/, and agitation is maintained throughout each of the further steps 2/, 3/, and optionally, 4/. Moreover, intervals of agitation can be implemented between each of steps 1/ through 3/, and optionally step 4/. This allows the liquid phase, or a combination of the liquid phase from step 1/ with one or more further constituents to sit and/or homogenize prior to adding another constituent.

Manufacturing of the mixture in step a/ can be operated under inert conditions, at room temperature as well as elevated temperature, and/or at standard pressure, elevated or reduced pressure, all this referred to the conditions in the mixing vessel. Preferably, step a/ is operated under inert conditions at a temperature in the range from 0 to 100° C. and ambient pressure, which is 1 bar (101.3 kPa), based on the absolute scale (0 kPa=absolute vacuum). Agitation can be achieved by rotating the mixing vessel or by inserting a rotating mixer into a static mixing vessel. A preferred mode of operation includes the use of a flask as static mixing vessel and a stirrer.

In step b/ the mixture from step a/ is subjected to irradiation with light of a wavelength selected from a range of 300 to 600 nm having an intensity in the range from 0.025 to 1 W/cm$^2$ to obtain the composition.

It was found that exposing a mixture comprising a quantum material as described above to light can enhance the quantum yield of the mixture compared with a mixture of quantum material which is not treated this way.

In an embodiment of the invention, the wavelength of the light is selected in the range of 350-500 nm. The intensity of light can be same or varying with the wavelength over the spectrum.

In another embodiment of the invention, the intensity of the light is in the range from 0.05 to 0.5 W/cm$^2$.

A fourth aspect of the invention is method of manufacturing a layered composite comprising at least these steps:
(A) Manufacturing a mixture by at least these steps:
  i) Providing a quantum material; preferably in a liquid phase;
  ii) Adding a macromolecular compound comprising an anchoring group;
  iii) Adding an organic additive; and
  iv) optionally adding at least an organic solvent.
(B) Applying the mixture to a substrate in order to form a layer; and
(C) Drying the layer on the substrate.

Steps i)-iv) can be carried out in individual actions or by just combining some or all components to the mixture in one vessel and forming the mixture by stirring the vessel's content.

A layered composite in the present context refers to an item, which comprises at least a substrate and at least one layer. The layered composite can have more than one layer, e.g. 2, 3, 4, 5, 6, 7, 8, 9 or 10 layers. These layers can be all positioned on one side of the substrate. With some substrates, one or more of the layer can be on a surface of the substrate which is averted from the surface onto which the layer of the invention is formed. Moreover, the layered composite can have two or more layers formed from one or more, equal or different compositions, as mentioned above.

Providing a substrate can be performed by any means which is known to and considered potentially useful by a skilled person to work the present invention. Preferred ways of providing includes mounting on a substrate holder, placing on a rotating dish, e.g. in a spincoater or in an inkjet printer.

A suitable substrate can be of any kind known to and considered potentially useful by the skilled person to work the present invention. Preferred examples of a substrate are a piece of glass, a piece of a polymer and a layered structure.

In step (2), a macromolecular compound comprising at least one anchoring group is added to the quantum material of step (1). The macromolecular compound can be added as a solid, for example as powder. It can also be dispersed or dissolved in a further liquid phase. The liquid phase can comprise any kind of liquid phase, optionally comprising one or more of the organic solvents, which is known to the skilled person and considered useful to have a quantum material and the macromolecular compound comprising at least one anchoring group dispersed therein. Reference is made to the section of the first aspect to the present invention regarding organic solvents and preferred embodiments. A preferred organic phase for this is PGMEA.

In step (3) an organic additive is added to the combined phases of step (1) and (2). The organic additive can be added in pure or diluted form. Preferably, the organic additive is added pure. Reference is made to the section related to the organic additive, as described in the first aspect to the present invention, in particular regarding a preferred choice of organic additive and further preferred embodiments.

In optional step (4), at least an amount of at least an organic solvent is added. The organic solvent of this step can be same or different to any organic solvent present in any of the liquid phases added in any one of step (1)-(3). Reference is made to the section of the first aspect to the present invention regarding suited organic solvents and preferred embodiments. A preferred organic phase for this is PGMEA.

The mixture of step (A) can be obtained by agitating the constituents of step (1)-(3), and optionally including the constituent of step (4). Agitation can be performed individually in each of the aforementioned steps (1) through (3) and optionally also in step (4). In a preferred embodiment, a liquid phase is provided under agitation with the quantum material in step 1/, and agitation is maintained throughout each of the further steps (2), (3), and optionally, (4) Moreover, intervals of agitation can be implemented between each of steps (1) through (3), and optionally step (4). This allows the liquid phase, or a combination of the liquid phase from step (1) with one or more further constituents to sit and/or homogenize prior to adding another constituent.

Manufacturing of the mixture in step (A) can be operated under inert conditions, at room temperature as well as elevated temperature, and/or at standard pressure, elevated or reduced pressure, all this referred to the conditions in the mixing vessel. Preferably, step (A) is operated under inert conditions at a temperature in the range from 0 to 100° C. and ambient pressure, which was 1 bar (101.3 kPa), based on the absolute scale (0 kPa=absolute vacuum). Agitation can be achieved by rotating the mixing vessel or by inserting a rotating mixer into a static mixing vessel. A preferred mode of operation includes the use of a flask as static mixing vessel and a stirrer.

Applying the mixture in step (B) can be performed by any means which is known to and considered potentially useful by a skilled person to work the present invention. Preferred ways of applying include spin-coating and dip-coating.

After having applied the mixture to the substrate in step (B), wherein a layer was formed, this layer is subjected to a drying step, step (C), in order to stabilize the layer on the substrate. For example, the drying can be a heat treatment. Any means of heat treatment can be employed which are known to and considered potentially useful by a skilled person to work the present invention. Amongst them, heat treatment in a stream of hot gas and or heating the layer in an oven are preferred. The heat treatment may affect evaporation of solvent as well as polymerization and/or cross-linking reactions of one or more constituents of the composition. By such heat treatment, a stable layer comprising the aforementioned quantum material is obtained on the substrate.

In an embodiment of the fourth aspect of the invention, at least one of the following features applies:
a/ The mixture obtained from step (A) is irradiated with light prior to step (B).
b/ The layer on the substrate is irradiated with light in a step (D) following to step (C);
wherein the light has a wavelength selected from a range of 300 to 600 nm having an intensity in the range from 0.025 to 1 W/cm$^2$ to obtain the composition.

It was found that exposing a mixture comprising a quantum material as described above to light could enhance the quantum yield of the mixture compared with a mixture which is not treat this way. The irradiation with light can be light of any wavelength, spectrum and intensity, considered possibly suitable by a skilled person.

In an embodiment of the invention, the wavelength of the light is selected in the range of 350-500 nm. The intensity of light can be same or varying with the wavelength over the spectrum.

In another embodiment of the invention, a single wavelength of light can be chosen. In this case more than 90% of the light applied has a wavelength of the mentioned wavelength ±2 nm.

In another embodiment of the invention, the intensity of the light is in the range from 0.05 to 0.5 W/cm$^2$.

It was further found that the efficiency of a layer on a substrate can be enhanced, when exposing the layer comprising a quantum layer to irradiation, as in step b/. The layer can be a liquid phase, for example as in step (B) of the fourth aspect of the invention, or a solid layer of a layered composite, for example as in the sixth aspect of the invention. Preferred embodiments are the same as the embodiments described about step a/.

A fifth aspect of the invention is layered composite obtainable by the method of the fourth aspect or one of its embodiments. As already mentioned, a preferred layered composite comprises a substrate and at least a layer wherein the at least one layer is a polymer film.

In a preferred embodiment, the thickness of the layer is in the range of 0.5 μm to 200 μm, for example from 2 to 100 μm, or from 4 to 50 μm. The thickness of the layer is most preferred in the range from 4 to 50 μm. The thickness of the layer is determined in a direction perpendicular to a plane created by the surface of the substrate which is adjacent to the layer, and the multiple layers respectively. The thickness of the layer can be determined by cutting a sample piece and analyzing the layers along the cut perpendicular through the substrate using Scanning Electron Microscopy (SEM). Two or more layers can be part of the layered composite by further preference.

A sixth aspect of the invention is a layered composite comprising,
α) A substrate; and
β) At least a layer comprising;
   a. A quantum material;
   b. A macromolecular compound comprising at least one anchoring group;
   c. An organic additive.

Preferred embodiments of the components of the sixth aspect of the invention, in particular of the substrate, the quantum material, their coating, the macromolecular compound comprising at least one anchoring group and the organic additive are the same as described above, and in particular as those described with respect to the first, the third, fourth and the fifth aspect of the invention. The at least one layer in β) is preferably obtained from a composition according to the first aspect of the invention or one of its embodiments, and/or by one of the methods according to the second and fourth aspect of the invention, and the embodiments thereto.

A seventh aspect of the invention is an optical device comprising a layered composite as described above or as obtainable by aforementioned processes. The Layered composite can be an optical sheet, for example, a color filter, a color conversion film, remote phosphor tape, or another film or filter.

The optical device comprising the layered composite can any known to the skilled person. Examples of such optical device are a liquid crystal display device (LCD), an organic light emitting diode (OLED), a backlight unit for an optical display, a light emitting diode device (LED), micro electro mechanical systems (here in after "MEMS"), electro wetting display, an electrophoretic display, a lighting device and a solar cell.

A height aspect of the invention is a use of an organic additive for improving the emission efficiency of a quantum material. A way to determine the emission efficiency is measuring the quantum yield of light which travels through a layered composite as described above.

A ninth aspect of the invention is a use of an organic additive for dispersing a quantum material in a matrix polymer.

In a preferred embodiment of this aspect of the invention, the matrix polymer can be selected from an acrylate, an epoxy resin, a polyurethane and a polysiloxane, or a combination of two or more thereof.

TEST METHODS

Quantum Yield

Measurements of Quantum Yield (QY), Center Wavelength (CWL, also referred to as: peak wavelength) and Full width half max (FWHM, also referred to as: peak band) in solutions are performed on a Hamamatsu Quantaurus QY Absolute PL quantum yield spectrometer C11347-11 (in the following referred to as "Hamamatsu Quantaurus").

PREFERRED EMBODIMENTS

Embodiment 1. A composition comprising at least these components:
  i) a semiconducting light emitting nanoparticle;
  ii) a macromolecular compound comprising at least an anchoring group;
  iii) an organic additive.

Embodiment 2. The composition of embodiment 1, wherein the organic additive is defined by formula (Ia) or (Ib)

$$M\text{-}(X\text{—}Y)_2 \quad (Ia);$$

$$X\text{—}Y \quad (Ib),$$

wherein
  M is a divalent metal ion,
  X is a hydrocarbon chain, and
  Y is a functional group.

Embodiment 3. The composition according to embodiment 2, wherein at least one of the following applies:
  a) M is selected from the group consisting of $Zn^{2+}$, $Mg^{2+}$ and $Cd^{2+}$;
  b) Y is selected from the group consisting of carboxylate, carbamate, xanthate, phosphonate, phosphate, thiolate; or a combination of two or more thereof.

Embodiment 4. The composition any one of embodiments 1 to 3, wherein the organic additive is defined by formula (II),

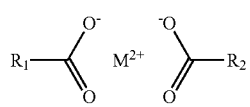

wherein
  M is selected from the group consisting of $Zn^{2+}$, $Mg^{2+}$ and $Cd^{2+}$;
  $R_1$ and $R_2$ can be same or different, linear or branched, and each $R_1$, $R_2$ is selected from the group consisting of an alkyl having a chain of 1 to 16 carbons atoms or an alkenyl group having a chain of 1 to 15 carbon atoms.

Embodiment 5. The composition of any one of the preceding embodiments, wherein the organic additive comprises a Zinc carboxylate.

Embodiment 6. The composition of any one of the preceding embodiments, wherein the at least one anchoring group of the macromolecular compound is ionic.

Embodiment 7. The composition of any one of the preceding embodiments, wherein the at least one anchoring group of the macromolecular compound is selected from the group consisting of phosphine group, phosphine oxide group, phosphate group, phosphonate group, thiol group, tertiary amine, carboxyl group, hetero cyclic group, silane group, sulfonic acid, hydroxyl group; or a combination of two or more thereof.

Embodiment 8. The composition of any one of the preceding embodiments, wherein the macromolecular compound has a number average molecular weight of at least 1,000 g/mol.

Embodiment 9. The composition of any one of the preceding embodiments, wherein the macromolecular compound is based on a copolymer.

Embodiment 10. The composition of embodiment 9, wherein the copolymer is selected from the group consisting of graft copolymer, block copolymer, alternating copolymer, random copolymer.

Embodiment 11. The composition of any one of the preceding embodiments, wherein the macromolecular compound comprises at least one acrylate.

Embodiment 12. The composition of any one of the preceding embodiments, wherein the composition further comprises at least an organic phase.

Embodiment 13. The composition of any one of the preceding embodiments, wherein the composition further comprises a matrix polymer.

Embodiment 14. The composition of embodiment 13, wherein the matrix polymer is selected from an acrylate, an epoxy resin, a polyurethane and a polysiloxane.

Embodiment 15. A method of manufacturing a composition with improved quantum yield, comprising at least these steps:
  (a) Manufacturing a mixture by at least these steps:
    1/ Providing a semiconducting light emitting nanoparticle,
    2/ Adding a macromolecular compound comprising at least an anchoring group;
    3/ Adding an organic additive
  (b) Subjecting the mixture from step (a) to irradiation with light of a wavelength selected from a range of 300 to 600 nm having an intensity in the range from 0.025 to 1 W/cm² to obtain the composition.

Embodiment 16. A method of manufacturing a layered composite comprising at least these steps:
  (A) Manufacturing a mixture by at least these steps:
    (1) Providing a semiconducting light emitting nanoparticle;
    (2) Adding a macromolecular compound comprising at least an anchoring group;
    (3) Adding an organic additive;
  (B) Applying the mixture to a substrate in order to form a layer; and
  (C) Drying the layer on the substrate.

Embodiment 17. The method of embodiment 16, wherein the at least one of the following features applies:
  (a) The mixture obtained from step (A) is irradiated with light prior to step (B);
  (b) The layer on the substrate is irradiated with light in a step (D) following to step (C);
  wherein the light has a wavelength selected from a range of 300 to 600 nm having an intensity in the range from 0.025 to 1 W/cm² to obtain the composition.

Embodiment 18. A layered composite obtainable or obtained by the method of embodiment 16 or 17.

Embodiment 19. A layered composite comprising:
  α) A substrate;
  β) At least a layer comprising
    a. A semiconducting light emitting nanoparticle;

b. A macromolecular compound comprising at least an anchoring group;
c. An organic additive.

Embodiment 20. An optical device comprising a layered composite according to any one of embodiments 18 to 19.

Embodiment 21. Use of an organic additive to improve the emission efficiency of a semiconducting light emitting nanoparticle.

Embodiment 22. Use of light of a wavelength in the range from 300 to 600 nm having an intensity in the range from 0.025 to 1 W/cm2 to improve the quantum yield of a composition comprising a semiconducting light emitting nanoparticle and an organic additive.

EXAMPLES

The following examples illustrate some aspects of the invention. It is understood that the examples and embodiments described herein are for illustrative purposes only and that various modifications or changes in light thereof may be suggested by one skilled in the art without departing from the scope of the present invention. Accordingly, the invention is not limited by or to the examples. Amounts mentioned in the tables below refer to wt.-% if not indicated to the contrary.

Example 1

A solution of 0.4 ml of Propylene glycol methyl ether acetate (PGMEA) is mixed with 0.1 ml DISPERBYK®-2000 until the solution became clear. 10 mg of pure InP (Zn)/ZnSe Quantum Dots (Quantum Yield (QY)=20%) are added to this solution together with 3 mg of Zinc Acetate. The solution is sonicated for 10 minutes and heated for 1 minute at 90° C. After 6 hours, the obtained solution is clear with the quantum yield of 40%. In contrast, using the same procedure without addition of the Zinc acetate reduces the quantum yield of the solution to 6%. The quantum yield is measured using a Hamamatsu Quantaurus C11347 spectrometer.

| Dispersion conditions | Quantum Yield |
| --- | --- |
| Quantum dot, purified solution in toluene | 20% |
| Cleaned quantum dots in PGMEA, with BYK 2000 | 6% |
| Cleaned quantum dots in PGMEA, with BYK 2000 and Zinc acetate | 40% |

Example 2

A solution of 0.4 ml of Propylene glycol methyl ether acetate (PGMEA) is mixed with 0.1 ml DISPERBYK®-2000 until the solution became clear. 80 mg of purified InP(Zn)/ZnSe Quantum dots are added to this solution together with 10 mg of Zinc acetate. The solution is sonicated for 10 minutes at 60° C. The solution is left for 10 hours under illumination with 450 nm LED with flux of 300 mW/cm2. The obtained solution is clear. The quantum yield is increased by 4% relative to the original solution of the quantum dots in toluene. In contrast, a solution made by the same procedure without addition of the Zinc acetate or without illumination remains turbid showing reduced quantum yield.

| Dispersion conditions | Quantum Yield |
| --- | --- |
| Quantum dot, purified solution in toluene | 27% |
| 1) quantum dots in PGMEA, with BYK 2000 | 2% |
| 2) quantum dots in PGMEA, with BYK 2000, illuminated | 12% |
| 3) quantum dots in PGMEA, with BYK and Zinc acetate | 8% |
| 4) quantum dots in PGMEA, with BYK 2000 and Zinc acetate, illuminated | 31% |

The Quantum yield (QY) is measured using a Hamamatsu Quantaurus C11347 spectrometer. Quantum dots with Zinc acetate and a treatment with light exhibit the best results.

The invention claimed is:

1. A method of manufacturing a composition with improved quantum yield, comprising at least these steps:
   a/ manufacturing a mixture by at least these steps:
      1/ providing a semiconducting light emitting nanoparticle,
      2/ adding a macromolecular compound comprising at least an anchoring group;
      3/ adding an organic additive,
      and
   b/ subjecting the mixture from step a/ to irradiation with light of a wavelength selected from a range of 300 to 600 nm having an intensity in the range from 0.025 to 1 W/cm2 to obtain the composition;
   wherein the organic additive is defined by formula (Ia)

$$M\text{-}(X\text{—}Y)_2 \qquad (Ia)$$

wherein
   M is a divalent metal ion,
   X is a hydrocarbon chain, and
   Y is a functional group.

2. The method according to claim 1, wherein at least one of the following applies:
   a) M is selected from the group consisting of $Zn^{2+}$, $Mg^{2+}$ and $Cd^{2+}$; and
   b) Y is a carboxylate, carbamate, xanthate, phosphonate, phosphate, thiolate,
   or a combination of two or more thereof.

3. The method according to claim 1, wherein the organic additive is defined by formula (II),

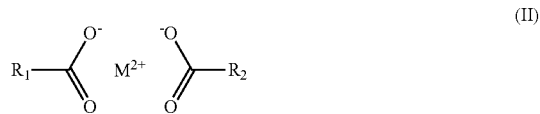

(II)

wherein
   M is selected from the group consisting of $Zn^{2+}$, $Mg^{2+}$ and $Cd^{2+}$;
   $R_1$ and $R_2$ can be same or different, linear or branched, and each $R_1$ and $R_2$ is selected from the group consisting of an alkyl having a chain of 1 to 16 carbons atoms and an alkenyl group having a chain of 1 to 15 carbon atoms.

4. The method according to claim 1, wherein the organic additive comprises a Zinc carboxylate.

5. The method according to claim 1, wherein the at least one anchoring group of the macromolecular compound is ionic.

6. The method according to claim 1, wherein the at least one anchoring group of the macromolecular compound is a phosphine group, phosphine oxide group, phosphate group, phosphonate group, thiol group, tertiary amine, carboxyl group, hetero cyclic group, silane group, sulfonic acid, hydroxyl group or a combination of two or more thereof.

7. The method according to claim 1, wherein the macromolecular compound has a number average molecular weight of at least 1,000 g/mol.

8. The method according to claim 1, wherein the macromolecular compound is based on a copolymer.

9. The method according to claim 8, wherein the copolymer is selected from the group consisting of graft copolymer, block copolymer, alternating copolymer, and random copolymer.

10. The method according to claim 1, wherein the macromolecular compound comprises at least one acrylate.

11. The method according to claim 1, wherein the composition further comprises an organic phase.

12. The method according to claim 1, consisting of these steps:
  a/ manufacturing a mixture by at least these steps:
  1/ providing a semiconducting light emitting nanoparticle,
  2/ adding a macromolecular compound comprising at least an anchoring group;
  3/ adding an organic additive, and
  b/ subjecting the mixture from step a/ to irradiation with light of a wavelength selected from a range of 300 to 600 nm having an intensity in the range from 0.025 to 1 W/cm$^2$ to obtain the composition.

* * * * *